United States Patent
Rapp et al.

(10) Patent No.: US 8,102,733 B2
(45) Date of Patent: Jan. 24, 2012

(54) COMMUNICATING USING SONAR SIGNALS AT MULTIPLE FREQUENCIES

(75) Inventors: John W. Rapp, Manassas, VA (US); Joseph S. Lee, Oak Hill, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 678 days.

(21) Appl. No.: 12/075,382

(22) Filed: Mar. 10, 2008

(65) Prior Publication Data

US 2009/0067289 A1    Mar. 12, 2009

Related U.S. Application Data

(60) Provisional application No. 60/906,115, filed on Mar. 9, 2007.

(51) Int. Cl.
 *G01S 15/00* (2006.01)
 *H04B 11/00* (2006.01)
(52) U.S. Cl. ........................ 367/134
(58) Field of Classification Search ........... 367/134, 367/2, 3, 6
 See application file for complete search history.

(56) References Cited

U.S. PATENT DOCUMENTS

| | | | |
|---|---|---|---|
| 3,742,440 A | 6/1973 | Ehrlich et al. | |
| 4,180,793 A | 12/1979 | Lindstrum | |
| 4,393,483 A | 7/1983 | Hammond et al. | |
| 4,992,988 A | 2/1991 | Koehler et al. | |
| 5,018,114 A * | 5/1991 | Mackelburg et al. | 367/134 |
| 5,119,341 A | 6/1992 | Youngberg | |
| 5,432,754 A * | 7/1995 | Brady et al. | 367/134 |
| 5,442,358 A | 8/1995 | Keeler et al. | |
| 5,452,262 A * | 9/1995 | Hagerty | 367/134 |
| 5,579,285 A | 11/1996 | Hubert | |
| 5,784,339 A * | 7/1998 | Woodsum et al. | 367/134 |
| 5,838,636 A | 11/1998 | Ashford et al. | |
| 6,359,834 B1 | 3/2002 | English | |
| 6,584,382 B2 | 6/2003 | Karem | |
| 6,590,377 B2 | 7/2003 | Prockup | |
| 6,738,314 B1 | 5/2004 | Teeter et al. | |
| 6,802,236 B1 | 10/2004 | Richardson | |
| 2003/0057936 A1 | 3/2003 | Prockup | |
| 2006/0085106 A1 | 4/2006 | Gaudiano et al. | |
| 2006/0195903 A1 | 8/2006 | Cox | |
| 2009/0067289 A1 * | 3/2009 | Lee et al. | 367/134 |

OTHER PUBLICATIONS

Andrew J. Viterbi. "Error Bounds for Convolutional Codes and an Asymptotically Optimum Decoding Algorithm", IEEE Transactions on Information Theory, vol. IT-13, No. 2, Apr. 1967, pp. 260-269.

* cited by examiner

*Primary Examiner* — Daniel Pihulic

(74) *Attorney, Agent, or Firm* — Kevin D. Jablonski; Graybeal Jackson LLP

(57) ABSTRACT

An embodiment of an apparatus includes a communication circuit and a transducer array coupled to the communication circuit. The communication circuit is operable to generate first and second information signals, and the transducer array is operable to generate in response to the first information signal a first sonar signal having a first frequency, and to generate in response to the second information signal a second sonar signal having a second frequency. The transducer array may generate the first and second sonar signals simultaneously to increase the transmission bandwidth. Where such an apparatus is a buoy, then the buoy may relay signals from an above-surface vessel to an unmanned underwater vehicle (UUV), and may relay signals from the UUV to the vessel. Therefore, the buoy allows the vessel to control the UUV without a cable linking the buoy and the vessel, and thus allows one to eliminate such a cable.

42 Claims, 5 Drawing Sheets

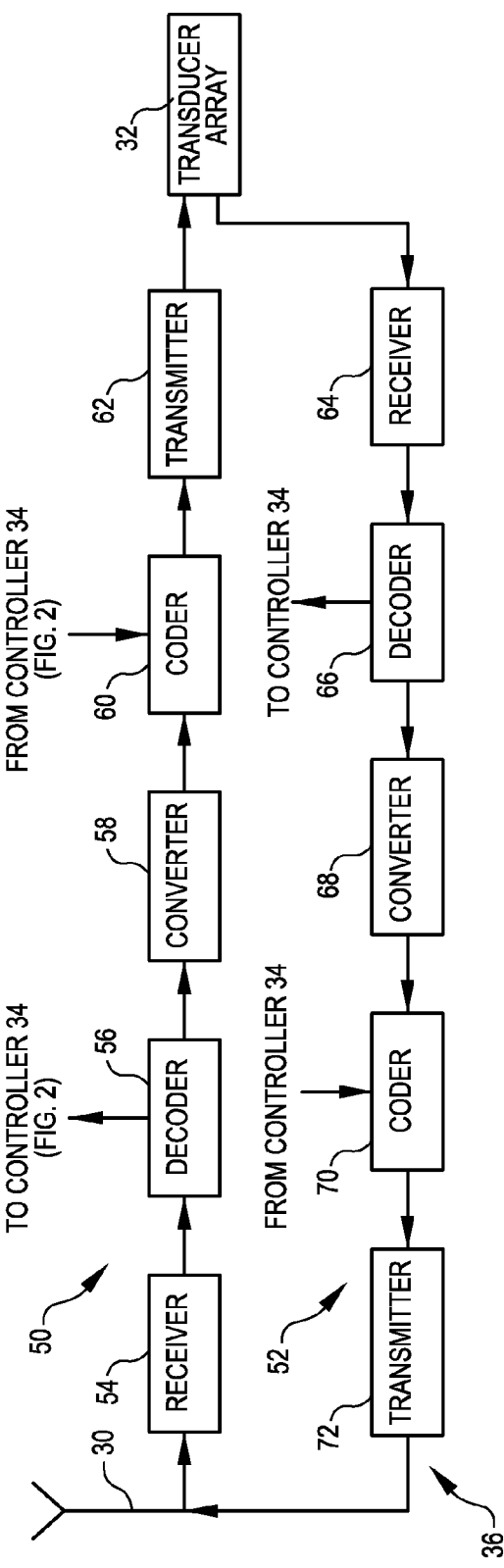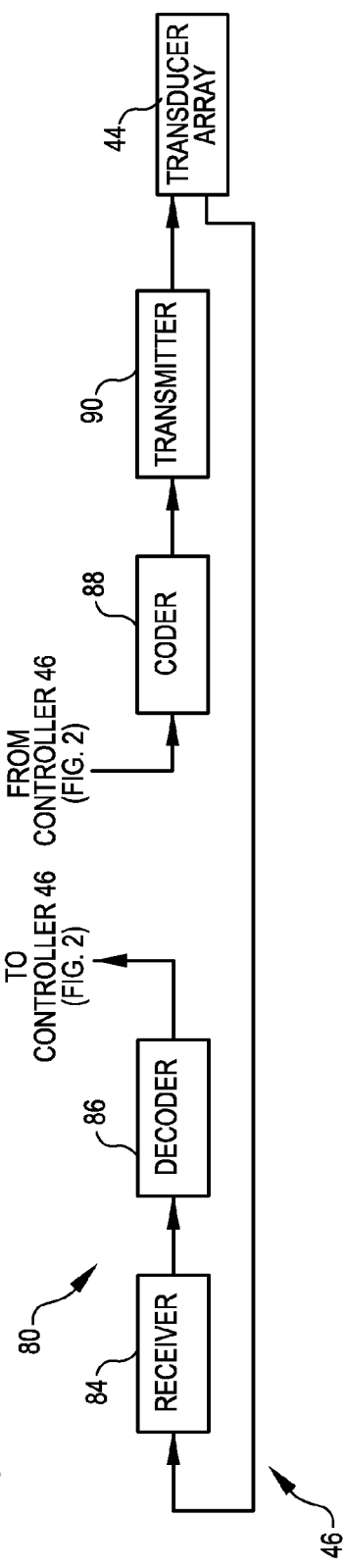

COMMUNICATING USING SONAR SIGNALS AT MULTIPLE FREQUENCIES

CLAIM OF PRIORITY

This application claims priority to U.S. Provisional Application Ser. No. 60/906,115, filed on Mar. 9, 2007, which is incorporated by reference.

BACKGROUND

An unmanned underwater vehicle (UUV) may be used in a variety of applications, such as mapping the ocean floor or training a submarine crew.

FIG. 1 shows a UUV 10, which is disposed in a body of water 12 and which is attached to a ship 14 with a tether 16. The UUV 10 receives control signals (e.g., electrical or optical signals) from the ship 14 and sends data signals to the ship via a cable that runs inside of, or that is intertwined with, the tether 16. The control signals may command the UUV 10 to perform actions such as diving, surfacing, moving at a predetermined depth, illuminating an object (not shown in FIG. 1), grabbing the object, and generating a "ping" that simulates the reflection of a sonar signal from the hull of a submarine. And the data signals may include, e.g., pixels of an image captured by the UUV 10.

Unfortunately, the cost of the tether 16 may be prohibitive, and the space occupied by the tether and its storage assembly (not shown in FIG. 1) on the ship 14 may be significant. For example, if the UUV 10 is used to explore the ocean floor, then the tether 16 may be anywhere from one mile long to over five miles long. A tether of such length may be expensive to purchase and to maintain, and the tether storage assembly (not shown in FIG. 1), which includes the drum about which the tether is wound and the motor for rotating the drum and a boom for directing the tether over the bow of the ship 14, may be relatively large.

Furthermore, the need for the tether 16 may limit the applications for which the UUV 10 is suited. For example, the need for the tether 16 may prevent one on an airplane or helicopter from operating the UUV 10. Or, the presence of the tether 16 may limit the speed at which the ship 14 may sail and the distance that the ship may sail while the UUV 10 is deployed.

SUMMARY

In an embodiment, an apparatus includes communication circuitry and a transducer array coupled to the communication circuitry. The communication circuitry is operable to generate first and second information signals, and the transducer array is operable to generate in response to the first information signal a first sonar signal having a first frequency, and to generate in response to the second information signal a second sonar signal having a second frequency. The transducer array may generate the first and second sonar signals simultaneously to increase the transmission bandwidth.

Where such an apparatus is a buoy, then the buoy may relay signals from an above-surface vessel to a UUV, and may relay signals from the UUV to the vessel. Therefore, the buoy allows the vessel to control the UUV without a cable linking the buoy and the vessel, and thus allows one to eliminate the tether between the UUV and the vessel. Consequently, the buoy allows one to use the UUV in applications for which a tethered UUV may be unsuitable. Furthermore, the generation of the signals that the buoy transmits to the UUV may be controlled to a varying degree by the vessel.

BRIEF DESCRIPTION OF THE DRAWINGS

FIG. 3 is schematic block diagram of an embodiment of the communication circuitry within the buoy of FIG. 2.

FIG. 4 is a schematic block diagram of an embodiment of the communication circuitry within the UUV of FIG. 2.

DETAILED DESCRIPTION

Figure 1:
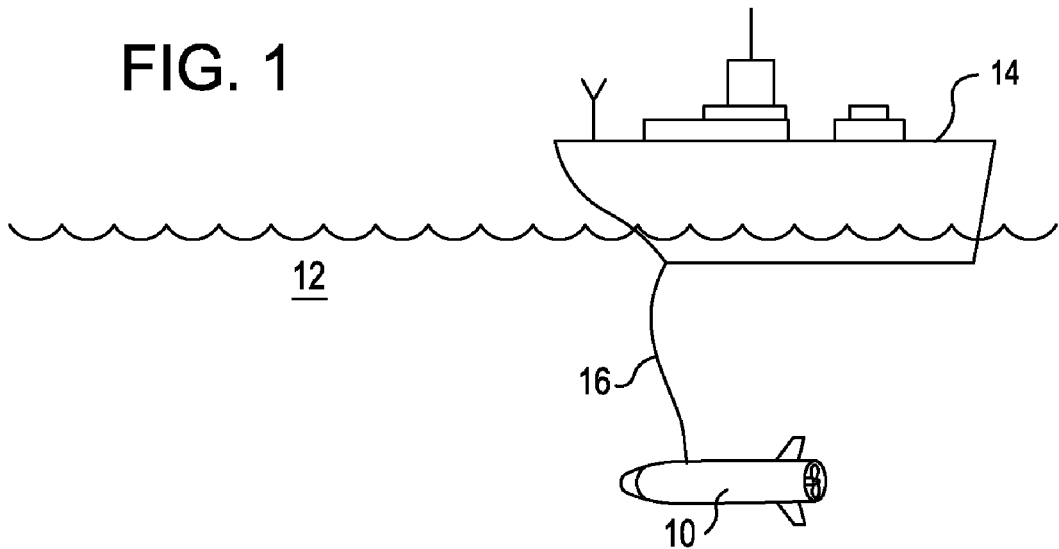
FIG. 1 is a diagram of a UUV conventionally tethered to a vessel.
Figure 2:
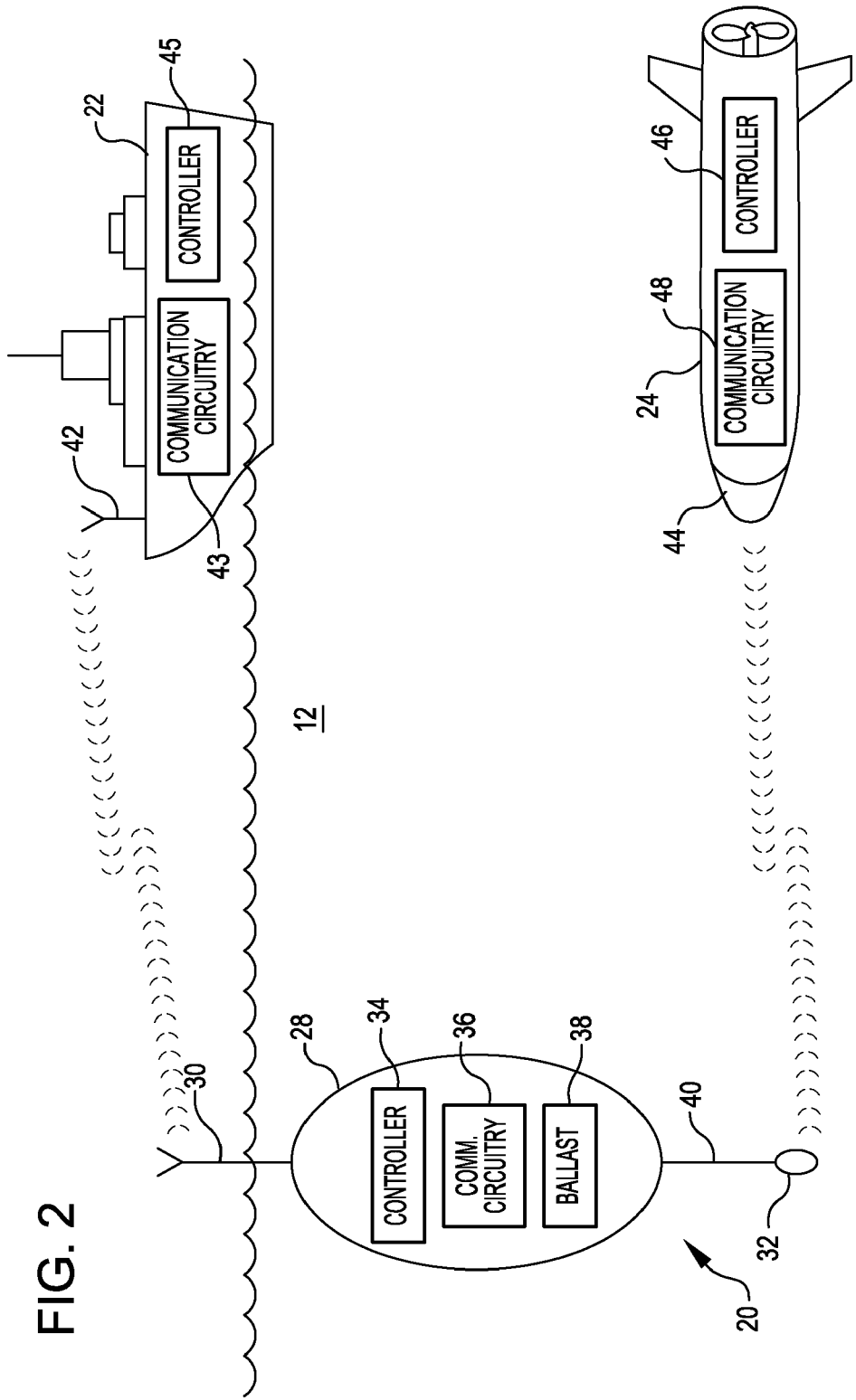
FIG. 2 is a diagram of an embodiment of a buoy, and of a vessel and a UUV that communicate via the buoy.

FIG. 2 is a diagram of an embodiment of a buoy 20, and of a vessel 22 and a UUV 24 that are operable to communicate with each other via the buoy. Although the vessel 22 is shown as a water-faring ship, the vessel may be, e.g., an airplane, helicopter, submarine, or spaceship or satellite. Because the transmission path below the surface of the water 12 is significantly different from the transmission path above the surface of the water, the buoy 20 acts as an interface between the two transmission paths. That is, the buoy 20 communicates with the ship 22 using signals (e.g., RF signals) that are suitable for the above-surface transmission path, and communicates with the UUV 24 using signals (e.g., sonar signals) that are suitable for the below-surface transmission path. Although shown as being deployed in water, the buoy 20, the ship 22, and the UUV 24 may be disposed in a fluid other than water.

The buoy 20 includes a fluid-tight housing 28, a radio-frequency (RF) antenna 30, and a transducer array 32. For example, the buoy 20 may be a directional-command-activated-sonobuoy-system (DICASS) buoy modified to operate according to an embodiment of the invention, a modified directional-low-frequency-analysis-and-recording (DIFAR) buoy, or a modified AN/SSQ-57SPC (ANM) buoy. In an embodiment, only the software of the DICASS, DIFAR, or ANM buoy is modified so that the buoy 20 operates according to an embodiment of the invention. In another embodiment, the buoy 20 may be an unmodified DICASS, DIFAR, or ANM buoy, where communication circuitry aboard the vessel 22 or the UUV 24 is modified so that the buoy operates according to an embodiment of the invention.

The liquid-tight housing 28 encloses a controller 34, communication circuitry 36, and an optional ballast mechanism 38 for adjusting the depth of the buoy 20.

The controller 34 controls components and operations of the buoy 20 including the communication circuitry and the ballast mechanism 38, and may include a processor or a peer-vector machine as disclosed in U.S. Patent Application Ser. No. 60/906,115, which is incorporated by reference. The processor or peer-vector machine may execute instructions or instantiate pipeline circuitry that causes the controller 34 to operate as described below. The controller 34 may receive commands from the ship 22 via the communication circuitry 36, and may issue commands to the UUV 24 via the communication circuitry. To issue a command to the UUV 24, the controller 34 may cause the communication circuitry to receive the command from the ship 22 and pass the command through to the UUV, or, the controller may generate the command independently of the ship 22.

The communication circuitry 36 receives and transmits RF signals from/to the ship 22 via the antenna 30, and receives and transmits sonar signals from/to the UUV 24 via the transducer array 32—although a sonar signal is sometimes limited to a pressure wave that propagates through water, as used herein, a sonar signal includes, but is not limited to, any pressure wave that propagates through any fluid. In an embodiment, the communication circuitry 36 transmits signals to the ship 22 on one RF frequency, and receives signals from the ship on another RF frequency. In this latter embodiment, the buoy may include two antennas 30, one for receiving and one for transmitting. Alternatively, instead of or in addition to RF signals, the communication circuitry 36 may receive and transmit from/to the ship 22 optical or other types of signals suitable for transmission through the medium (e.g., the atmosphere) separating the antenna 30 and the ship 22. Likewise, instead of or in addition to sonar signals, the communication circuitry 36 may receive and transmit from/to the UUV 24 optical or other types of signals suitable for transmission through the medium (e.g., the water) separating the transducer array 32 and the UUV. The communication circuitry 36 is further discussed below in conjunction with FIG. 3.

The optional ballast mechanism 38 may be conventional, and may include a ballast tank, a source of a compressed gas, and controllable valves for the tank and gas source (these components are not shown in FIG. 2). To decrease the depth of the buoy 20, the controller 34 may increase the buoyancy of the buoy 20 by opening a valve to the source of the gas to "blow" the water out of the ballast tank (the exiting water is effectively replaced by the less-dense blow-in gas). Conversely, to increase the depth of the buoy 20, the controller 34 may decrease the buoyancy of the buoy 20 by opening a valve that floods some or all of the ballast tank with water or another liquid.

Still referring to FIG. 2, the antenna 30 is coupled to the housing 28, may have a conventional arrangement of one or more antenna elements, and may be telescoping or otherwise sufficiently rigid so that the antenna may extend above the surface of the water. Alternatively, the antenna 30 may be designed to float on the surface of the water. The antenna 30 may also be rotatable so that the controller 34 may position the antenna for the best signal-to-noise ratio (SNR) along the transmission path between the buoy 20 and the ship 22.

The transducer array 32 may be directly attached to the housing 28, or may be attached to the housing via a flexible or rigid stem 40, such as a cable. If directly attached to the housing 28, then the transducer array 32 may be disposed about the entire perimeter of the housing such that the array may transmit signals in any direction, and receive signals from any direction; and even if not directly attached to the housing, the transducer array 32 may be designed to transmit signals in any direction, and to receive signals from any direction. The array 32 may include one or more conventional transducer elements that may each simultaneously transmit or receive multiple signals having different frequencies, or may include one or more transducer elements that may each transmit or receive at any one time only a single signal having a single frequency. An example of the latter type of array 32 is where each transducer element is designed to transmit and receive signals at a single respective frequency. Alternatively, the transducer array 32 may be located at various depths in the water 12 by deploying various lengths of the cable 40 between the buoy housing 28 and the transducer array. In an embodiment, the length of the cable 40 may be adjusted by the controller 34 causing a reeling device (not shown in FIG. 2) to roll/unroll the cable 40.

The ship 22 includes one or more conventional antennas 42 (only one shown in FIG. 2) for transmitting signals to and receiving signals from the antenna(s) 30 of the buoy 20. The ship also includes communication circuitry 43 and a controller 45.

The UUV 24 includes a transducer array 44 for transmitting signals to and receiving signals from the transducer array 32 of the buoy 20, and includes a controller 46, which may be similar to the controller 34, and communication circuitry 48 which is further discussed below in conjunction with FIG. 4. The UUV 24 may include other components, such as a conventional ballast mechanism that may be similar to the ballast mechanism 38, a conventional propulsion mechanism, and a conventional steering mechanism, which are omitted from FIG. 2.

Still referring to FIG. 2, the operation of the buoy 20 is described according to an embodiment of the invention in which the ship 22 sends a command to the UUV 24 via the buoy. Although not specifically stated, the controller 34 may cause the communication circuitry 36, the ballast mechanism 28, and the transducer array 32 to operate as described below. Similarly, the controller 45 may cause the communication circuitry 43 to operate as described below, and the controller 46 may cause the communication circuitry 48 to operate as described below.

If the depth of the buoy 20 is such that the antenna 30 is below water, then the controller 34 first controls the ballast mechanism 38 to raise the buoy to a depth where the antenna is above water 12, is even with the surface of the water, or is close enough to the surface to transmit and receive signals to/from the ship antenna 42. If the buoy 20 is not always at the surface, then the controller 34 may be programmed to periodically surface the buoy 20 so that the ship 22 may periodically communicate with the buoy. Alternatively, if the buoy 20 lacks the ballast mechanism 38, then the buoy may always be at the surface.

Next, the buoy 20 receives one or more commands from the ship 22 via the antennas 30 and 42. The commands may be for the buoy 20 itself, or for the UUV 24. If a command is for the buoy 20, then the communication circuitry 36 passes the command to the controller 34, which acknowledges receipt of the command, executes the command, and acknowledges execution of the command. For example, the buoy 20 might receive a command to lower the transducer 32 to a specific depth in the water 12, whereby the controller 34 causes a reeling device (not shown) to unroll the cable 40. As another example, the buoy 20 might receive a command to use different frequency bands of the transducer 32 whereby the controller 34 causes parameters to change in the communication software or the communication circuitry 36. If the command is for the UUV 24, then the communication circuitry 36 transmits the command to the UUV 24 via the transducer array 32. If the command is not in a format that is compatible with the UUV 24, then the communication circuitry 36 may convert the command into a format that is compatible with the UUV 24 before transmitting the command.

Then, the UUV transducer array 44 receives the command from the buoy 20, and the controller 46 acknowledges receipt of the command and then executes the command. Example UUV commands include dive, surface, and maneuver.

The operation of the buoy 20 is similar when the UUV 24 sends data to the buoy via the transducer arrays 44 and 32, and the buoy forwards the data to the ship 22 via the antennas 30 and 42.

Still referring to FIG. 2, alternate embodiments are contemplated. For example, if the buoy 20 drifts out of communication range from the ship 22 or from the UUV 24, then one may deploy another buoy 20 within range of the ship 22 and the UUV 24, and this new buoy effectively replaces the out-of-range buoy and may operate in a similar manner. The deployment of the new buoy 20 may be from the ship 22 or from another vessel such as an airplane or drone. Moreover, although described as being unmanned, the vehicle 24 may be a manned vehicle such as a submarine. In addition, the controller 34 of the buoy 20 may be omitted or have limited operability, and the controller 45 of the ship 22 may control the operations of the buoy's communication circuitry 36.

FIG. 3 is a schematic block diagram of an embodiment of the buoy communication circuitry 36 of FIG. 2. Although not specifically stated, the controller 34 of FIG. 2 may control some or all of the components of the communication circuitry, including the components discussed below.

The communication circuitry 36 includes a from-ship-to-buoy/to-UUV channel 50, and a from-UUV/to-buoy/to-ship channel 52. In an embodiment, the channel 50 is operable to receive data from the ship 22 (FIG. 2) on one of many frequencies (e.g., ninety nine frequencies), and the channel 52 is operable to transmit data to the ship on the same or on another of these frequencies. In such an embodiment, the housing 28 may include switches (not shown) to allow one to manually select the desired receive and transmit frequencies prior to launching the buoy 20. The channel 50 is disposed between the antenna 30 and the transducer array 32, and includes a receiver 54, a decoder 56, a converter 58, a coder 60, and a transmitter 62. Each of these components may be coupled to and controlled by the controller 34.

The receiver 54 receives, demodulates (if needed), and amplifies a signal from the ship 22.

The decoder 56 recovers information, such as data or a command, from the amplified signal. For example, the signal from the ship 22 may be coded with a conventional error-correction code (ECC) such as parity or a Hamming code, or the signal may be encrypted or compressed. Moreover, the decoder 56 may recover the formation using a Viterbi detector to reduce the error rate in the recovered information. The decoder 56 may determine the intended destination of the information, i.e., the buoy 20 or the UUV 24, by examining an address field within the information. If the recovered information is intended for the buoy 20, then the decoder 56 provides this information to the controller 34. For example, the recovered information may include a buoy command. If, however, the information is for the UUV 24, then the decoder 56 may pass the information directly to the converter 58.

The converter 58 translates the information from the decoder 56 into a format that is compatible with the UUV 24. If the information is already in a suitable format, then the converter 58 may pass the information to the coder 60 unchanged. If it is a priori known that all information from the ship 22 is in a format that is compatible with the UUV 24, then the converter 58 may be omitted from the communication circuitry 36. An example of a format is a format that incorporates the control packet of FIG. 7.

The coder 60 may receive information directly from the converter 58 (or directly from the decoder 56 if the converter 58 is omitted) or from the controller 34, where the received information is in a format compatible with the UUV 24. The coder 60 codes this information, for example, according to a conventional ECC, and may also encrypt or compress the information.

The transmitter 62 receives the coded information from the coder 60, and generates one or more signals that carry the information. Examples of such signals include conventional AM or FM signals, OFDM-based signals, or the signals further discussed below in conjunction with FIGS. 5 and 6. The transmitter 62 provides the one or more signals to the transducer array 32, and causes the transducer array to convert the one or more signals into one or more corresponding sonar signals. For example, the one or more signals from the transmitter 62 may be electrical signals that drive the transducer elements in the array 32, causing them to vibrate and to thus generate the corresponding sonar signals.

The channel 52 is also disposed between the antenna 30 and the transducer array 32, and includes a receiver 64, a decoder 66, a converter 68, a coder 70, and a transmitter 72. Each of these components may be coupled to and controlled by the controller 34.

The receiver 64 receives, demodulates (if needed), and amplifies a signal from the UUV 24.

The decoder 66 recovers information, such as data or a command, from the amplified signal. For example, the signal from the UUV 22 may be coded with a conventional error-correction code (ECC) such as parity or a Hamming code, or the signal may be encrypted or compressed. Moreover, the decoder 66 may recover the information using a Viterbi detector to reduce the error rate in the recovered information. The decoder 66 may determine the intended destination of the information, i.e., the buoy 20 or the ship 22, by examining an address field within the information. If the recovered information is intended for the buoy 20, then the decoder 66 provides this information to the controller 34. The recovered information may be a buoy command or data intended for the buoy 20. For example, the UUV 24 may send an error rate in the information received by the UUV from the buoy 20, and the transmitter 62 may use this error rate to adjust the characteristics of the transmitted signals to better match the transmission path between the buoy and the UUV, and to thus reduce the error rate. If, however, the recovered information is for the ship 22, then the decoder 56 may pass the information directly to the converter 68.

The converter 68 translates the information from the decoder 66 into a format that is compatible with the ship 22. If the information is already in a suitable format, then the converter 68 may pass the information to the coder 70 unchanged. If it is a priori known that all information from the UUV 24 is in a format that is compatible with the ship 22, then the converter 68 may be omitted from the communication circuitry 36.

The coder 70 may receive information directly from the converter 68 (or directly from the decoder 66 if the converter 68 is omitted) or from the controller 34, where the received information is in a format compatible with the UUV 24. The coder 70 codes this information, for example, according to a conventional ECC, and may encrypt or compress the information.

The transmitter 72 receives the coded information from the coder 70, and generates one or more conventional signals that carry the information. For example, the signals may be conventional AM or FM signals, OFDM-based signals, or the signals discussed below in conjunction with FIGS. 5 and 6. The transmitter 72 provides the one or more signals to the antenna 30, which converts the one or more signals into one or more corresponding RF signals.

Still referring to FIG. 3, alternate embodiments of the communication circuitry 36 are contemplated. For example, instead of including two channels 50 and 52, the communication circuitry 36 may include a single channel that is used for ship-to-UUV, ship-to-buoy, UUV-to-ship, and UUV-to-buoy communications. Furthermore, the decoder 56, converter 58, coder 60, may be omitted from the communication circuitry 36 of the buoy 20, and even the controller 34 may be omitted from the buoy, and the functions attributed to these components may be performed by the communication circuitry 43 or the controller 45 of the ship 22 (FIG. 2). Performing these functions on the ship 22 may allow one to use a unmodified DICASS, DIFAR, or ANM buoy as the buoy 20. This also may confine any modifications to circuitry or software to the ship 22 or to the UUV 24. In addition, although the communication circuitry 36 is disclosed as being a hardware circuit having distinguishable hardware components, the entire communication circuitry or one or more components/functions thereof may be implemented in software running, e.g., on the controller 34 or controller 45. Furthermore, one or more of the controllers 34, 45, and 46 may be state machines, and execute few if any program instructions.

FIG. 4 is a schematic block diagram of an embodiment of the UUV communication circuitry 46 of FIG. 2.

The communication circuitry 46 includes a channel 80 that is coupled to the transducer array 44, and includes a receiver 84, a decoder 86, a coder 88, and a transmitter 90. Each of these components may be coupled to and controlled by the controller 46. In this embodiment, the channel 80 does not include a converter because the signals received by the receiver 84 are already in a format compatible with the UUV 24, for example, due to the action of the converter 58 (FIG. 3) of the buoy 20. But the channel 80 may include a converter in another embodiment.

The receiver 84 receives (via the transducer array 44), demodulates (if needed), and amplifies a sonar signal from the buoy 20.

The decoder 86 recovers information, such as data or a command, from the amplified signal. For example, the signal from the buoy 20 may be coded with a conventional error-correction code (ECC) such as parity or a Hamming code, or the signal may be encrypted or compressed. Moreover, the decoder 86 may recover the information using a Viterbi detector to reduce the error rate in the recovered information. The decoder 86 provides the recovered information to the controller 46.

The coder 88 receives information from the controller 46, and codes this information, for example, according to a conventional ECC, and may encrypt or compress the information. For example, the information may be a rate of error in the information received from the buoy 20 as calculated by the controller 46.

The transmitter 90 receives the coded information from the coder 88, and generates one or more signals that carry the information. For example, the signals may be conventional AM or FM signals, OFDM-based signals, or the signals discussed below in conjunction with FIGS. 5 and 6. The transmitter 90 provides the one or more signals to the transducer array 44, and causes the transducer array to convert the one or more signals into one or more corresponding sonar signals.

Referring to FIGS. 3 and 4, the communication circuitry 43 and controller 45 of the ship 22 (FIG. 2) may be similar to the communication circuitry 36 and 48 and to the controllers 34 and 46, or may include one or more similar components.

Figure 5:
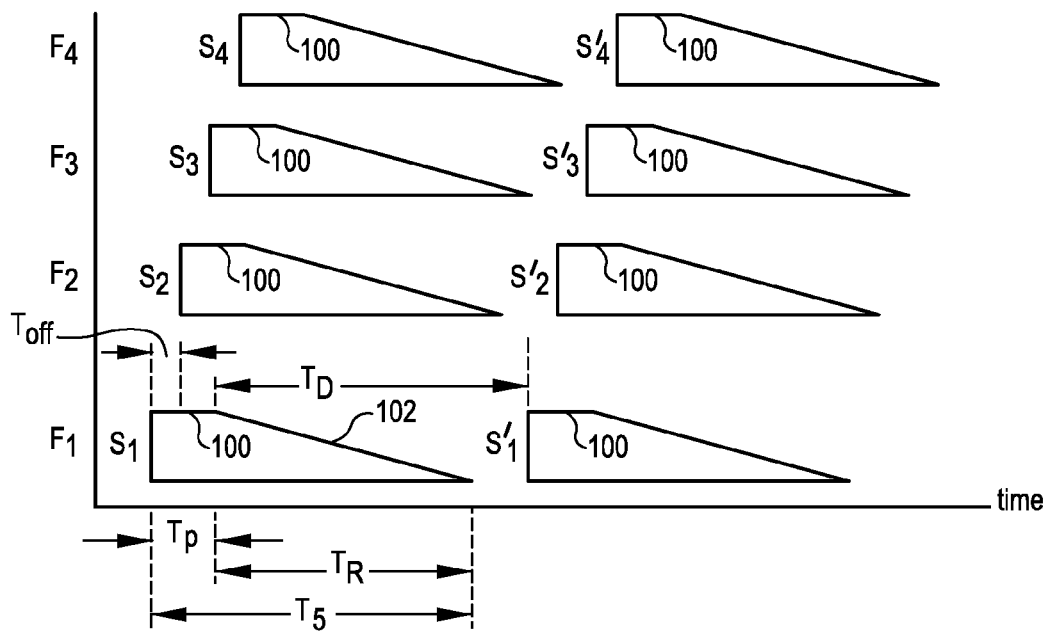
FIG. 5 is a timing diagram of an embodiment of groups of information signals that the buoy of FIG. 2 may generate and transmit to the UUV of FIG. 2.

FIG. 5 is a timing diagram of an embodiment of sonar signals $S_1$-$S_4$ and $S_1'$ and $S_4'$ that the transmitter 62 (FIG. 3) may cause the transducer array 32 (FIGS. 2 and 3) to generate.

As discussed below, the transducer array 32 may simultaneously generate multiple ones of the signals $S_1$-$S_4'$ at respective frequencies to increase the transmission bandwidth of the buoy 20.

For brevity, only the signal $S_1$ is described in detail, it being understood that the other signals $S_2$-$S_4$ and $S_1'$-$S_4'$ are similar.

The signal $S_1$ has frequency $F_1$ and a duration $T_S$, and includes a pulse portion 100 having a duration $T_P$, and a reverberation portion 102 having a duration $T_R$, such that $T_S=T_P+T_R$. The pulse portion 100 is the portion of the signal $S_1$ during which at least one element of the transducer array 32 vibrates at the frequency $F_1$, which is a pure tone. This is sometimes called "continuous-wave" signal generation, and the signal $S_1$ is sometimes called a continuous-wave (CW) signal. In one embodiment, $T_S \geq 10/F_1$. The reverberation portion 102 is the portion of the signal $S_1$ during which no elements of the transducer array 32 vibrate at the frequency $F_1$, but during which the environmentally reflected energy from the pulse portion 100 has not yet decayed to below a predetermined level in the vicinity of the buoy 20 and the UUV 24.

The pulse portion 100 represents a single bit of data, the value of which depends on the phase of the tone at $F_1$. For example, assume that a logic 1 is represented by a +1 signal level, and a logic 0 is represented by a −1 signal level. The signal level corresponding to the data bit modulates a sinusoidal carrier signal having a frequency $F_1$ such that the carrier signal has a phase of 0° during the pulse portion 100 if the data bit is a logic 1, and has a phase of 180° during the pulse portion if the data bit is a logic 0. This data-modulation technique is sometimes called binary-phase frequency-shift-keying (BPSK).

Alternatively, the value of the data bit represented by the pulse portion 100 depends on the amplitude of the tone at $F_1$. For example, the F1 carrier signal has a significant amplitude (i.e., the carrier signal is "on") during the pulse portion 100 if the data bit is a logic 1, and has a relatively small or zero amplitude (i.e., the carrier signal is "off") during the pulse portion if the data bit is a logic 0. This amplitude-modulation technique may be compatible with unmodified DICASS, DIFAR, and ANM buoys.

To increase the transmission bandwidth, the transducer array 32 generates the signals $S_2$-$S_4$ simultaneously with the signal $S_1$, where the pulse portions 100 of the signals $S_2$-$S_4$ are data-modulated tones at frequencies $F_2$-$F_4$, respectively. In an embodiment, $F_1 \approx 6500$ Hz, $F_2 \approx 7500$ Hz, $F_3 \approx 8500$ Hz, and $F_4 \approx 9500$ Hz. Therefore, if the pulse portions 100 of the signals $S_1$-$S_4$ each represent a respective bit of data, then the transducer array 32 (FIG. 2) transmits four bits of data at a time, thus quadrupling (or nearly quadrupling) the transmission bandwidth as compared to a buoy that transmits only one bit of data at a time.

The transducer array 32 (FIG. 2) may include four transducer elements, where each element generates a respective one of the signals $S_1$-$S_4$. For example, each element may be designed to vibrate at a respective one of the frequencies $F_1$-$F_4$. Alternatively, the transducer array 32 may include fewer than four transducer elements, where one or more of the elements are excited in different modes to generate the signals $S_1$-$S_4$. For example, an unmodified DICASS, DIFAR, or ANM buoy may use a single transducer element that vibrates at one of the respective frequencies $F_1$-$F_4$, where the vibrating frequency is set by a buoy command from the ship 22 (FIG. 2).

Still referring to FIG. 5, in an embodiment, the transmitter 62 (FIG. 3) may offset the pulse portions 100 of the signals $S_1$-$S_4$ by $T_{Off}$ to better match the transmission path, or to allow one to use an unmodified DICASS, DIFAR, or ANM buoy as the buoy 20 (FIG. 2) as discussed below. For example, the transmitter 62 starts the pulse portion 100 of $S_1$, and then starts the pulse portion 100 of $S_2$ a time $T_{Off}$ after starting the pulse portion of $S_1$. Similarly, the transmitter starts the pulse portion 100 of $S_3$ a time $2T_{Off}$ after starting the pulse portion of $S_1$, and starts the pulse portion of $S_4$ a time $3T_{Off}$ after starting the pulse portion of $S_1$. Although shown as being equal, the value of $T_{Off}$ between one pair of pulse portions 100 may be different than the value of $T_{Off}$ between another pair of pulse portions.

Allowing an offset $T_{Off}$ between the pulse portions 100 of consecutive signals S may facilitate the use of an unmodified DICASS, DIFAR, or ANM buoy as the buoy 20 (FIG. 2). Unmodified versions of these buoys may be able to generate only one signal S per a series of one or more commands from the ship 22 (FIG. 2). For example, the ship 22 may cause the communication circuitry 36 (FIGS. 2 and 3) to generate $S_1$ by sending a first command to set the buoy transmission frequency at $F_1$, and then sending a second command to generate the pulse portion 100 of S1. Subsequently, the ship 22 may cause the communication circuitry 36 to generate $S_2$ by sending a third command to set the buoy transmission frequency at $F_2$, and then sending a fourth command to generate the pulse portion 100 of $S_2$. The difference in time between the first and third commands is or is approximately the value of $T_{Off}$ between the signals $S_1$ and $S_2$, and, therefore, $T_{Off}$ cannot be zero in such an embodiment. But even where $T_{Off} \neq 0$, there still may be a significant increase in the transmission bandwidth from the buoy 20 to the UUV 24 (FIG. 2). If transmission occurs at only a single frequency, then, for example, $T_{Off}$ between $S_1$ and $S_2$ would be greater than or equal to TP+TD (TD is further discussed below) to allow the dissipation of the reverberation period 102 of $S_1$ before sending $S_2$, and thus to prevent $S_1$ from interfering with $S_2$. But by using multiple transmission frequencies (e.g., $F_1$, $F_2$, $F_3$, and $F_4$), the buoy 20 may commence transmission of the second signal $S_2$ before the reverberation portion 102 of $S_1$ dissipates, and even during the pulse portion 100 of $S_1$. This is because $S_1$ and $S_2$ are in different frequency bands, and therefore, there is little or no interference of $S_2$ by $S_1$ and vice-versa in the frequency domain. Consequently, even though $T_{Off}$ may not equal zero for multi-frequency transmission, $T_{Off}$ still may be considerably smaller than it would be for single-frequency transmission, and thus the bandwidth may be considerably higher than it would be for single-frequency transmission.

Still referring to FIG. 5, the four data bits carried by the signals $S_1$-$S_4$ form a data symbol having a duration of $TS+3T_{Off}$, where the minimum data-symbol duration, and thus the highest transmission bandwidth, occurs when $T_{Off}=0$. Similarly, the four data bits carried by the signals $S_1'$-$S_4'$, form a data symbol, and so on for other groups of signals S.

The transmitter 62 generates the signals $S_1'$-$S_4'$ respective delay times after generating the signals $S_1$-$S_4$. For example, the transmitter 62 starts the pulse portion 100 of the signal $S_1'$ a delay time $T_D$ after starting the pulse portion 100 of the signal $S_1$. Similarly, the transmitter 62 starts the pulse portions 100 of the signals $S_2'$-$S_4'$ the delay time $T_D$ after starting the respective pulse portions of the signals $S_2$-$S_4$. The delay time $T_D$ may be greater than the reverberation time $T_R$ by an amount sufficient to statistically insure that even under worst-case transmission-path conditions, the transmitter 62 does not start to generate the signal $S_1'$ before the energy of the signal $S_1$ has dissipated to or below a predetermined level. Starting to generate the signal $S_1'$ before the energy of $S_1$ has sufficiently dissipated may cause inter-symbol interference, which may give rise to errors in the information recovered at the UUV 24 (FIG. 2) or other receiver.

The transmitter 62 (FIG. 3) may generate subsequent groups of four signals S in a similar manner. Alternatively, the transmitter 62 may generate subsequent groups of other numbers of signals S. For example, instead of always simultaneously generating four signals S, the transmitter 62 may sometimes generate only three signals S.

Still referring to FIG. 5, the transmitter 62 (FIG. 3) may initially adjust the duration $T_P$ of the pulse portion 100 for each signal $S_1$-$S_4$, $S_1'$-$S_4'$, etc.; e.g., in response to one or more conditions of the transmission path between the buoy 20 and the UUV 24 (FIG. 2). The transmitter 62 may first send out a test signal to determine these one or more conditions. For example, the transmitter 62 may cause the transducer array 32 to send a respective test signal at each frequency $F_1$-$F_4$, and the UUV 24 may send back an indication of the strength of the received signal at each frequency. Or, the transmitter 62 may determine the signal strength of a received reflection of each test signal, or may merely estimate the signal strength based on the distance between the buoy 20 (FIG. 2) and the UUV 24 (or other receiver). Alternatively, an operator may manually set $T_P$ for each frequency $F_1$-$F_4$ based on his experience with the path conditions. The weaker the strength of the received test signal, the longer the duration of $T_P$ that the transmitter 62 may use at that frequency. The duration $T_P$ of a signal S at one frequency need not be the same as the duration $T_P$ of signal S at another frequency, because the transmission path may have different characteristics at different frequencies. However, to maintain the signals $S_1$-$S_4$, $S_1'$-$S_4'$, etc., each having the same duration $T_S$, the transmitter 62 may set $T_P$ for each signal $S_1$-$S_4$, $S_1'$-$S_4'$, etc. to the longest duration $T_P$ determined for any one of the frequencies $F_1$-$F_4$. For example, if the transmission path degrades signals at the frequency $F_4$ the most, then the transmitter 62 selects a duration $T_P$ sufficient to account for the path degradation of the signal $S_4$, $S_4'$, etc., and then selects this same duration $T_P$ for the other signals $S_1$-$S_3$, $S_1'$-$S_3'$, etc, even though a shorter $T_P$ may be sufficient to account for the path degradation of these signals. In an embodiment, the transmitter 62 may select one of three values for the duration $T_P$, "short", "medium", and "long", where short $\approx 0.1$ seconds, medium $\approx 0.5$ seconds, and long $\approx 1$ second.

Furthermore, the transmitter 62 (FIG. 3) may continuously or periodically reevaluate the duration TP for signals S at each frequency $F_1$-$F_4$, for example, based on an error rate for the information received at the UUV 24 (FIG. 2) or other receiver. For example, if the UUV 24 reports an increase in the rate of errors in the information recovered from signals S at frequency $F_4$, then the transmitter 62 may increase the duration $T_P$ for signals at $F_4$, or for all of the signals S as discussed in the preceding paragraph.

Still referring to FIG. 5, alternate embodiments of the groups of signals S are contemplated. For example, each data symbol may include as few as one signal S, or more than four signals S. Furthermore, each symbol need not include the same number of signals S. Moreover, instead of BPSK encoding or amplitude encoding logic 1 and logic 0, the transmitter 62 (FIG. 3) may use another type of encoding.

Figure 6:
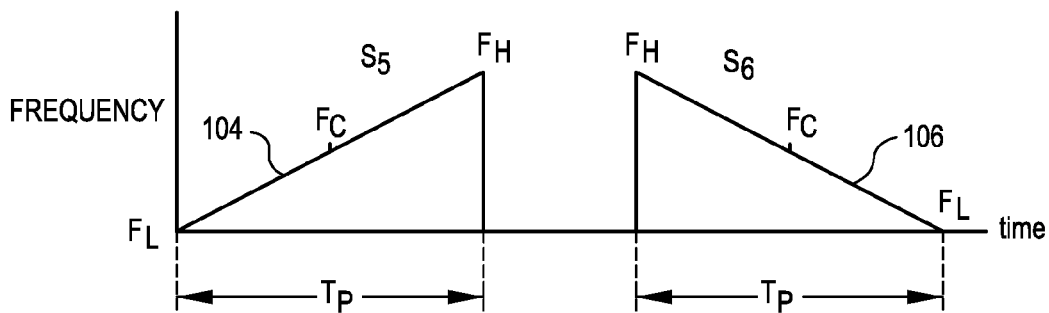
FIG. 6 is a diagram of another embodiment of information signals that the buoy of FIG. 2 may generate and transmit to the UUV of FIG. 2.

FIG. 6 is a timing diagram of another embodiment of sonar signals that the transmitter 62 (FIG. 3) may cause the transducer array 32 (FIGS. 2 and 3) to generate.

In addition to the CW pulses described in conjunction with FIG. 5, the buoy 20 may also generate frequency-swept signals S5 and S6. The pulse portion 104 of the signal $S_5$ linearly increases from a lowest frequency $F_L$, through a center frequency $F_C$, to a highest frequency $F_H$ over a duration $T_P$. For clarity, the reverberation portion of the signal $S_5$ is omitted from FIG. 6. For example, $T_P$ is in the range of approximately 0.1 to 1.0 seconds, $F_L = F_C - 500$ Hz, $F_H = F_C + 500$ Hz, and $F_C$ may have approximately one of the following values: 6500 Hz, 7500 Hz, 8500 Hz, and 9500 Hz.

In contrast, the pulse portion 106 of the signal $S_6$ linearly decreases from a highest frequency $F_H$, through a center frequency $F_C$, to a lowest frequency $F_L$ over the duration $T_P$. For clarity, the reverberation portion of the signal $S_6$ is omitted from FIG. 6. $T_P$, $F_L$, $F_C$, and $F_H$ may have the same values provided in the preceding paragraph.

The transmitter 62 (FIG. 3) may generate one signal $S_5$ at a time, or may simultaneously generate multiple linearly increasing signals like $S_5$ at different center frequencies $F_C$ to form symbols having multiple data bits, similar to the simultaneous generation of the signals $S_1$-$S_4$ in FIG. 5 to form a symbol. Furthermore, after generating a signal $S_5$, the transmitter 62 may delay generation of a subsequent signal $S_5'$ (not shown in FIG. 6) at the same center frequency $F_C$ until after the reverberation of the signal $S_5$ has decayed to or below a predetermined level.

Similarly, the transmitter 62 (FIG. 4) may generate one signal $S_6$ at a time, or may simultaneously generate multiple linearly decreasing signals like $S_6$ at different center frequencies $F_C$ to form symbols having multiple data bits. Furthermore, after generating a signal $S_6$, the transmitter 62 may delay generation of a subsequent signal $S_6'$ (not shown in FIG. 6) at the same center frequency $F_C$ until after the reverberation of the signal $S_6$ has decayed to or below a predetermined level.

Alternatively, the transmitter 62 (FIG. 4) may simultaneously generate one or more signals like $S_5$ with one or more signals like $S_6$ to form a symbol having multiple data bits, or may simultaneously generate one or more signals selected from signals like $S_1$-$S_4$ of FIG. 5 and from signals like $S_5$ and $S_6$ of FIG. 6 to form a symbol.

Still referring to FIG. 6, alternate embodiments of the signals $S_5$ and $S_6$ are contemplated. For example, although the values of $F_L$, $F_C$, $F_H$, and $T_P$ are shown as being equal for the signals $S_5$ and $S_6$, one or more of these values may be different for $S_5$ than for $S_6$. Furthermore, alternate embodiments similar to those discussed above in conjunction with FIG. 5 are also contemplated.

Referring to FIGS. 5 and 6, although the signals $S_1$-$S_6$ formed from particular waveforms are discussed, the transmitter 62 may cause the transducer array 32 to generate signals formed from other waveforms. Furthermore, although the transducer array 32 is discussed as generating signals $S_1$-$S_6$, the transducer array 44 may also generate these and other signals in response to the transmitter 90. Moreover, the ship 22 (FIG. 2) may include communication circuitry and a transducer array for receiving and generating these and other signals for direct communication with the buoy 20 or the UUV 24.

Figure 7:
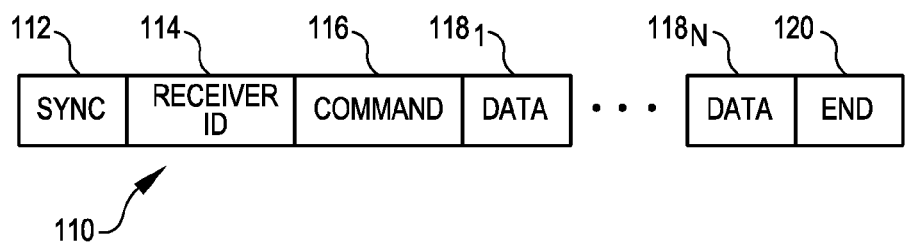
FIG. 7 is a diagram of an embodiment of a command packet that the buoy of FIG. 2 may generate and transmit to the UUV of FIG. 2.

FIG. 7 is a diagram of an embodiment of a command packet 110 that the buoy 20 of FIG. 2 may generate and transmit to the UUV 24 of FIG. 2.

The command packet 110 includes the following fields: a synchronization field 112, a receiver-identification field 114, a command field 116, data fields $118_1$-$118_N$, and an end field 120. Each field may include one or more symbols similar to those discussed above in conjunction with FIGS. 5 and 6, and the symbols within each field may include data that is coded, for example according to an ECC. Furthermore, a symbol within one field may be structured differently from a symbol in another field. For example, the command field 116 may include a symbol formed from continuous-wave signals at frequencies $F_1$-$F_4$, similar to the signals $S_1$-$S_4$ in FIG. 5, and the end field 120 may include a symbol formed by a single increasing-frequency signal at center frequency $F_1$, similar to the signal $S_5$ in FIG. 6. In addition, a symbol within one field may even be structured differently from another symbol in the same field. Moreover, the coder 60 of FIG. 3 may code a group of data that extends across multiple fields. For example, if the coded group of data comprises twenty bits, and the receiver-identification and command fields 114 and 116 together include twenty bits, then the coded group of data may occupy both of the receiver-identification and command fields.

The synchronization field 112 indicates to the receiving device (e.g., the UUV 24 OF FIG. 2) that a command packet is being sent, and may also indicate on which frequency or frequencies F the transmitter 62 (FIG. 3) and transducer array 32 (FIGS. 2 and 3) are generating signals, and may indicate one or more characteristics of these signals. For example, the synchronization field 112 may include the signals $S_1$-$S_4$ of FIG. 5, thus indicating to the receiving device that each symbol includes four continuous-wave signals at frequencies $F_1$-$F_4$ having pulse widths $T_P$ and pulse start times separated by $T_{Off}$. The synchronization field 112 may also include one or more signals S1'-S4' to indicate the value(s) for TD.

The receiver-identification field 114 effectively addresses the UUV 24 or other receiving device with which the buoy 20 wishes to communicate. The field 114 may be particularly useful where multiple UUVs 24 are deployed within range of the buoy 20.

The command field 116 includes a command for the UUV 24 or other receiving device identified by the field 114. For example, the command may be a set-depth command, which instructs the UUV 24 to set its depth to a value included in the subsequent data fields $118_1$-$118_N$.

The data fields $118_1$-$118_N$ include values that supplement a command in the field 114 as discussed in the preceding paragraph, or that provide other information to the UUV 24 or other receiver. For example, the data fields $118_1$-$118_N$ may include program instructions for loading into the UUV controller 46 (FIG. 2). Or, where the command packet 110 is being transmitted by the UUV 24 to the buoy 20, the data fields $118_1$-$118_N$ may include the pixels of an image captured by the UUV.

The end field 120 indicates the end of the command packet 110. For example, the end field 120 may include a single linearly increasing signal similar to the signal $S_5$ of FIG. 6.

In operation, after receiving the command packet 110, the UUV transmitter 90 (FIG. 4) may cause the transducer array 44 to transmit an acknowledgement field (not shown in FIG. 7) to indicate a receipt of the command packet with no uncorrectable errors (or the acknowledgment field may identify uncorrectable errors in the received packet, and may identify the fields in which these uncorrectable errors occurred). For example, when the received command packet 110 includes no uncorrectable errors, then the acknowledgement field may include a single linearly decreasing signal similar to the signal $S_2$ of FIG. 6, where $F_C$ may be the same as or different than the $F_C$ for the signal composing the end field 120. If, however, the received command packet 110 includes one or more uncorrectable errors, then the acknowledgement field may include one or more signals that request the buoy 20 to resend the command packet.

Still referring to FIG. 7, alternate embodiments are contemplated. For example, although the command packet 110 described as being transmitted from the buoy 20 to a receiving device such as the UUV 24 (FIG. 2), the UUV may also transmit information to the buoy 20 in the form of information packets that are similar to the command packet 110, but where the command field 116 is replaced with a field that identifies the data in the fields 118. For example, this data-identify field may indicate that the data in fields 118 includes the pixels of an image that the UUV 24 is uploading to the ship 22. Similarly, the transfer of information from the ship 22 to the buoy 20 may be according to information packets similar to the command packet 110, although the signals forming the command packet may not be sonar signals. Furthermore, the transfer of information from the buoy 20 to the ship 22 may include information packets with the command field 116 replaced with a data-identity field as described above. In addition, a sequence of one or more signals or symbols from the buoy 20 may have a different meaning than the same sequence of one or more signals or symbols from the UUV 24. Moreover, although shown having a specific format, the control packet 110 may have any format. Furthermore, the commands may be Huffman coded, such that commands that are used more frequently are represented by fewer signals or symbols than commands that are used less frequently.

Figure 8:
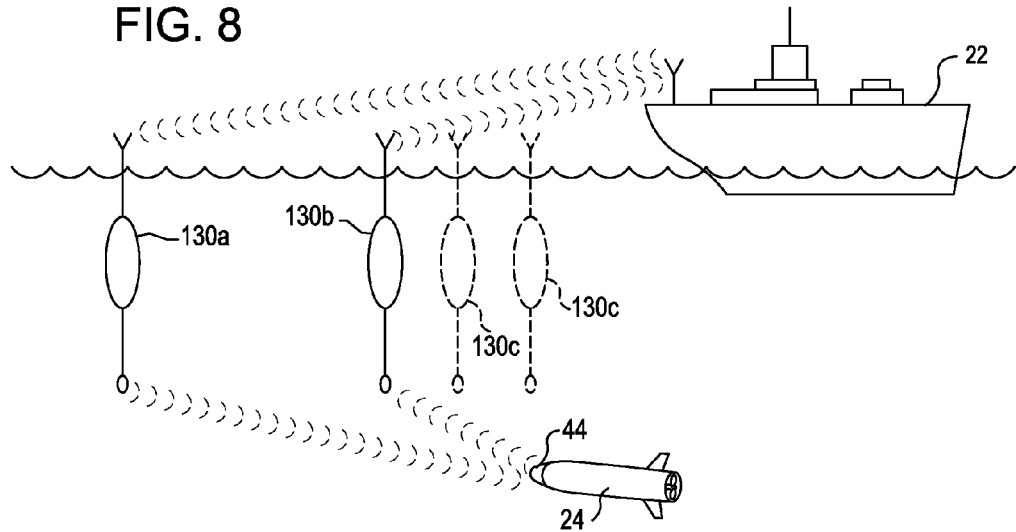
FIG. 8 is a diagram of an embodiment of multiple buoys, and of a vessel and a UUV that communicate via the buoys.

FIG. 8 is a diagram of an embodiment of multiple buoys 130, and of a ship 22 and a UUV 24 that are operable to communicate with each other via the buoys. In an embodiment, other than the differences disclosed below, the buoys 130 are each similar to the buoy 20 of FIG. 2.

The ship 22 sends commands to, and otherwise controls, the UUV 24 via the buoy 130a, for example, as discussed above in conjunction with FIGS. 2-7.

But the UUV 24 sends information to the ship 22 via the buoy 130b, and may also send information to the ship via one or more optional buoys 130c.

Designing the buoy 130a for linking the ship 22 and the UUV 24 for ship-to-UUV communications, and designing the buoys 130b and 130c to link the UUV to the ship for UUV-to-ship communications and to provide other capabilities may provide one or more advantages. For example, the buoys 130b and 130c may be either modified or unmodified DIFAR or ANM boots designed to acquire and track the position of the UUV 24 using conventional triangulation or direction finding techniques, and to periodically report the UUV position to the ship 22. Designing all of these capabilities into a single buoy, such as the boot 130a, may be relatively difficult and costly.

Furthermore, using multiple buoys 130b and 130c to link the UUV 24 to the ship 22 for UUV-to-ship communications may reduce the error rate in the information received at the ship from the UUV. For example, a computer (not shown in FIG. 8) on board the ship 22 may compare the same data bit received from the UUV 24 via three buoys 130b and 130c. If the data bit from two of the buoys 130b and 130c is a logic 1, and the same data bit from the other of the buoys 130b and 130c is a logic 0, then the ship computer may determine the value of the data bit to be a logic 1 based on that statistically, it is more likely that the logic 0 from the one buoy is erroneous than it is that the logic 1 from the two buoys is erroneous.

Alternately, a single data packet transmission from the UUV 24 may be encoded using forward error correction based on the Viterbi algorithm (developed by Andrew J. Viterbi; published in "Error Bounds for Convolutional Codes and an Asymptotically Optimum Decoding Algorithm", IEEE Transactions on Information Theory, Volume IT-13, pages 260-269, in April, 1967, and which is incorporated by reference), which is transmitted underwater and then received by unmodified ANM or DIFAR buoys, which are used for the buoys 130. These buoys radio transmit the unprocessed packets, which now may be corrupted separately by the underwater environmental noise. Then the ship 22 antenna(s) receive the radio transmissions of the unprocessed packets, which are now corrupted separately by the electromagnetic environmental noise. Each transmitted from each of the buoys 130 is then sampled separately to calculate respective 'branch metrics' in accordance with the Viterbi algorithm. The path metrics of the Viterbi algorithm are then computed utilizing the branch metrics calculated for each of the transmission paths, causing the selection of the surviving Viterbi paths to be optimized across all the transmission paths. The Viterbi decoding then proceeds as normal.

Still referring to FIG. 8, alternate embodiments are contemplated. For example, multiple buoys 130a may be used for linking the ship 22 and the UUV 24 for ship-to-UUV communications. For example, spacing the buoys 130a apart may increase the likelihood that the UUV 24 is always within range of at least one of the buoys 130a, and thus that the UUV 24 is always able to receive commands from the ship 22. Furthermore, all of the buoys 130a-130c may have all of the same capabilities.

Figure 9:
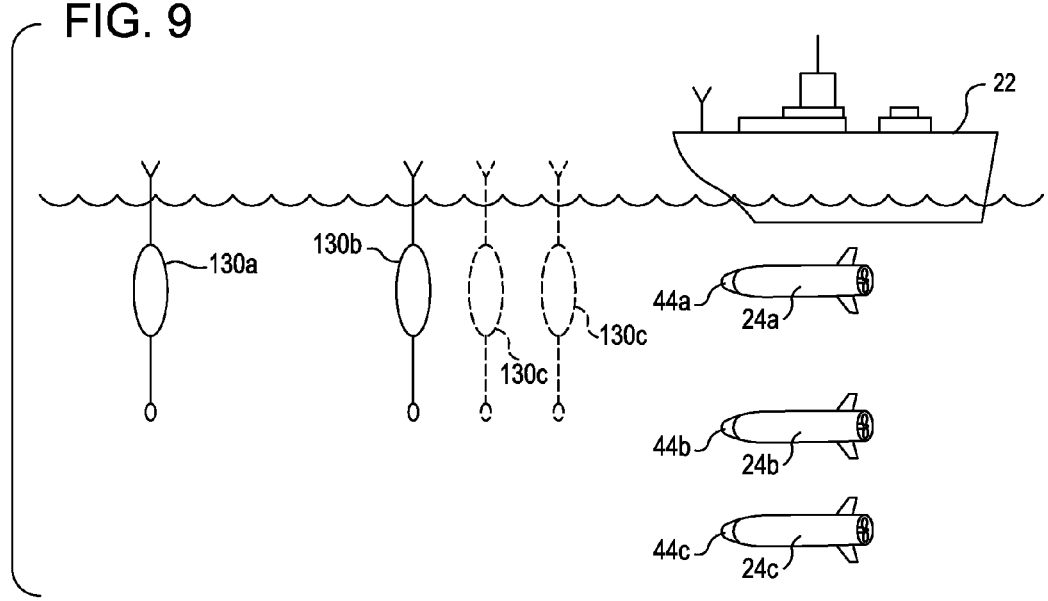
FIG. 9 is a diagram of an embodiment of multiple buoys, and of a vessel and multiple UUVs that each communicate with the vessel via the buoys.

FIG. 9 is a diagram of an embodiment of multiple buoys 130, and of a ship 22 and multiple UUVs 24 that are operable to communicate with each other via the buoys. In one embodiment, other than the differences discussed below, the buoys 130a-130c have capabilities similar to the buoys 130a-130c of FIG. 8, and the ship 22 communicates with each UUV 24 as discussed in conjunction with FIG. 8.

Because there are multiple UUVs 24 (here UUVs 24a-24c), the buoy 130a may specify for which of the UUVs 24 a communication is intended using, e.g., the receiver-identification field 114 of FIG. 7.

Furthermore, each UUV 24 may have a respective identification value that it provides to the buoy 130b, and to the optional buoys 130c if present, so that these buoys or the ship 22 may keep track of which UUV is which. For example, the transducer array 44 (FIGS. 2 and 4) of each UUV 24 may have the ability to generate continuous-wave signals, similar to the signals $S_1$-$S_4$ of FIG. 5, at twelve different tones $F_1$-$F_{12}$ that are selected from a group of thirty tones ranging from 100 Hz to 3000 Hz at 100 Hz intervals. The identification value for a UUV 24 may then be a respective combination of one or more of these signals. For example, the identification value for the UUV 24a may be four signals at $F_1$=100 Hz, $F_2$=1500 Hz, $F_3$=2300 Hz, and $F_4$=2900 Hz, and the transmitter 90 may cause the transducer array 44 to generate these four signals simultaneously or in sequence to identify the UUV 24 to the buoys 130b and 130c. It is well known how to track a submerged object emitting a tone using DIFAR or other sonobuoys, and sonar signal processing equipment such as on the SH-60B or P-3 Aircraft.

In operation according to an embodiment, the ship 22 may command all of the UUVs 24a-24c to come to a complete stop by sending appropriate command packets via the buoy 130a.

Then, the ship 22 may command one of the UUVs, for example the UUV 24a, to maneuver, and may also command this UUV to broadcast its identification value.

Next, the one UUV 24 broadcasts its identification value, so the buoys 130b and 130c, and thus the ship 22, now "know" the identity of the moving UUV 24, and may thereafter keep track of this UUV's position.

Still referring to FIG. 9, alternate embodiments are contemplated. For example, one or more of the signals that compose the identification value of one UUV, e.g., UUV 24a, may be at different frequencies as compared to the one or more signals that compose the identification value of another UUV, e.g., UUV 24b. Alternatively, each of the UUVs 24 may identify itself by including a respective identification value in an identification field of a data packet that the transducer array 44 (FIGS. 2 and 4) of the UUV transmits. Furthermore, although FIG. 9 includes three UUVs 24a-24c, more or fewer UUVs may be present. In addition, the transducer 44 of each UUV 24 may be able to generate more or fewer than twelve tones selected from more or fewer than thirty tones, which are selected from a range other than 100 Hz-3000 Hz and in other than 100 Hz increments.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. An apparatus, comprising:
a communication circuit operable to generate first and second information signals; and
a transducer array coupled to the communication circuit and operable to generate in response to the first information signal a first sonar signal including a first pulse that is modulated by a first carrier signal having a frequency that changes linearly over a first range that includes a first frequency, and to generate in response to the second information signal a second sonar signal including a second pulse that is modulated by a second carrier signal having a frequency that changes linearly over a second range that includes a second frequency.

2. The apparatus of claim 1 wherein the first and second information signals respectively represent first and second bits.

3. The apparatus of claim 1 wherein the transducer array comprises a single transducer.

4. The apparatus of claim 1 wherein the communication circuit is operable to cause the transducer array to simultaneously generate the first and second sonar signals.

5. The apparatus of claim 1 wherein the communication circuit is operable to cause the transducer array to simultaneously start generation of the first and second sonar signals and to simultaneously halt generation of the first and second sonar signals.

6. The apparatus of claim 1 wherein the communication circuit is operable to cause the transducer array:
to begin generation of the first sonar signal at a first time;
to begin generation of the second sonar signal at a second time after the first time;
to halt generation of the first sonar signal at a third time after the second time; and
to halt generation of the second sonar signal at a fourth time after the third time.

7. The apparatus of claim 1 wherein the communication circuit is operable to cause the transducer array:
to generate the first pulse having a first duration that is related to a received-value error rate at a remote apparatus; and
to generate the second pulse having a second duration that is related to the received-value error rate.

8. The apparatus of claim 1 wherein:
the communication circuit is operable to generate a third information signal after the first information signal; and
wherein the communication circuit is operable to cause the transducer array to generate a third sonar signal having the first frequency in response to the third information signal and a delay time after the transducer halts generation of the first sonar signal, the delay time being sufficient to allow a reverberation of the first sonar signal to decay to approximately a predetermined threshold.

9. The apparatus of claim 1, further comprising:
a fluid-buoyant housing;
wherein the communication circuit is disposed within the housing; and
wherein the transducer array is attached to the housing.

10. The apparatus of claim 1, further comprising:
an antenna operable to receive a third signal;
a receiver coupled to the antenna and operable to generate in response to the third signal an intermediate signal; and
wherein the communication circuit is operable to generate the first and second information signals in response to the intermediate signal.

11. The apparatus of claim 1 wherein:
the communication circuit is operable to generate subsequent information signals after the first and second information signals such that the first, second, and subsequent signals together represent coded information; and
wherein the communication circuit is operable to cause the transducer array to generate in response to the subsequent information signals subsequent sonar signals each having one of the first and second frequencies.

12. An apparatus, comprising:
a transducer array operable to receive a first sonar signal having a first frequency, and to receive simultaneously a second sonar signal having a second frequency and offset in time from the first sonar signal; and
a communication circuit coupled to the transducer array and operable to generate a first information signal in response to the first sonar signal and operable to generate a second information signal in response to the second sonar signal.

13. The apparatus of claim 12 wherein the communication circuit is operable to sequentially generate the first and second information signals.

14. The apparatus of claim 12 wherein:
the first sonar signal comprises a first pulse that is modulated by a first carrier signal having the first frequency; and
the second sonar signal comprises a second pulse that is modulated by a second carrier signal having the second frequency.

15. The apparatus of claim 12 wherein:
the first sonar signal comprises a first pulse that is modulated by a first carrier signal having a frequency that changes over a first range that includes the first frequency; and
the second sonar signal comprises a second pulse that is modulated by a second carrier signal having a frequency that changes over a second range that includes the second frequency.

16. The apparatus of claim 12, further comprising:
wherein the communication circuit is operable
to detect one or more errors in the first and second information signals; and
to determine from the detected one or more errors an information-signal error rate; and
to cause the transducer array to send the information-signal error rate to a source of the first and second sonar signals.

17. The apparatus of claim 12, further comprising:
a fluid-buoyant housing;
wherein the communication circuit is disposed within the housing; and
wherein the transducer array is attached to the housing.

18. A method, comprising:
generating a first sonar signal having a first frequency and a first duration; and
generating a second sonar signal having a second frequency and a second duration that simultaneously overlaps and is offset from the first duration.

19. The method of claim 18 wherein:
the first sonar signal includes first information; and
the second sonar signal includes second information.

20. The method of claim 18 wherein:
generating the first sonar signal comprises modulating a first information signal with a first carrier signal having approximately only the first frequency; and
generating the second sonar signal comprises modulating a second information signal with a second carrier signal having approximately only the second frequency.

21. The method of claim 18, wherein:
generating the first sonar signal comprises
modulating a first information signal with a first carrier signal, and
sweeping a frequency of the first carrier signal through a first range of frequencies, the first range having a center frequency approximately equal to the first frequency; and
generating the second sonar signal comprises
modulating a second information signal with a second carrier signal, and
sweeping a frequency of the second carrier signal through a second range of frequencies, the second range having a center frequency approximately equal to the second frequency.

22. A method, comprising:
generating a first sonar signal having a first frequency and a first duration; and
generating a second sonar signal having a second frequency and a second duration that overlaps and is offset from the first duration;
the method further comprising adjusting the first and second durations in response to a device that receives the first and second sonar signals.

23. A method, comprising:
generating a first sonar signal having a first frequency and a first duration; and
generating a second sonar signal having a second frequency and a second duration that overlaps and is offset from the first duration;
the method further comprising generating a third sonar signal having the first frequency after a reverberation of the first sonar signal decays to a predetermined level.

24. The method of claim 18 wherein:
generating the first sonar signal comprises generating the first sonar signal in a liquid medium; and
generating the second sonar signal comprises generating the second sonar signal in a liquid medium.

25. A method, comprising:
generating a first sonar signal having a first frequency and a first duration; and
generating a second sonar signal having a second frequency and a second duration that overlaps and is offset from the first duration;
the method further comprising:
receiving a third signal via a first non-liquid medium;
wherein generating the first sonar signal comprises generating the first sonar signal in a liquid first medium in response to the third signal; and
wherein generating the second sonar signal comprises generating the second sonar signal in the liquid first medium in response to the third signal.

26. A method, comprising:
receiving a first sonar signal having a first duration and a frequency that linearly sweeps through a first range;
receiving a second sonar signal having a second duration that overlaps the first duration and a frequency that linearly sweeps through a second range; and
recovering information from the first and second sonar signals.

27. The method of claim 26 wherein:
the first sonar signal comprises a first pulse that is modulated by a first carrier signal having a frequency that linearly sweeps through the first range; and
the second sonar signal comprises a second pulse that is modulated by a second carrier signal having a frequency that linearly sweeps through the second range.

28. The method of claim 26 wherein:
the first range includes a first frequency; and
the second range includes a second frequency.

29. A method, comprising:
transmitting a first sonar signal that represents information;
receiving the first sonar signal with multiple devices;
generating with each device a respective second signal from the first signal, each of the second signals representing the information; and
transmitting the respective second signal from each device to a destination.

30. A method, comprising:
transmitting a first sonar signal that represents information;
receiving the first sonar signal with multiple devices;
generating with each device a respective second signal from the first signal, each of the second signals representing the information; and
transmitting the respective second signal from each device to a destination;
wherein:
transmitting the first signal comprises transmitting the first signal in a liquid medium; and
transmitting the respective second signals comprises transmitting the respective second signals in a non-liquid medium.

31. A method, comprising:
transmitting a first sonar signal that represents information;
receiving the first sonar signal with multiple devices;
generating with each device a respective second signal from the first signal, each of the second signals representing the information; and
transmitting the respective second signal from each device to a destination;
wherein:
the devices are each disposed partially in the liquid medium and partially in the non-liquid medium; and
the destination is disposed in the non-liquid medium.

32. The method of claim 29 wherein each of the devices comprises a respective buoy.

33. The method of claim 29 wherein each of the second signals comprises a respective radio-frequency signal.

34. A non-transient computer-readable medium storing instructions that when executed by a processor, cause the processor:
to cause a communication circuit to generate first and second information signals; and
to cause a transducer array coupled to the communication circuit to generate in response to the first information signal a first sonar signal having a linearly varying first frequency, and to generate in response to the second information signal a second sonar signal having a linearly varying second frequency.

35. A non-transient computer-readable medium storing instructions that when executed by a processor, cause the processor:
   to allow a transducer array to receive a first sonar signal having a linearly varying first frequency, and to receive a second sonar signal having a linearly varying second frequency; and
   to cause a communication circuit coupled to the transducer array to generate a first information signal in response to the first sonar signal and to generate a second information signal in response to the second sonar signal.

36. An apparatus, comprising:
   a controller operable to generate at least one command that, when received by a communication circuit of a remote device having a transducer array, causes the communication circuit to generate first and second information signals, and causes the transducer array to generate in response to the first information signal a first sonar signal having a first frequency, and to generate in response to the second information signal a second sonar signal having a second frequency, temporally overlapping the first sonar signal, and temporally offset from the first sonar signal; and
   a local communication circuit coupled to the controller, operable to generate a command signal that represents the command, and operable to transmit the command signal to the remote communication circuit.

37. The apparatus of claim 36 wherein the remote device comprises a buoy.

38. A vessel, comprising:
   a controller operable to generate at least one command that, when received by a communication circuit of remote device having a transducer array, causes the communication circuit to generate first and second information signals, and causes the transducer array to generate in response to the first information signal a first sonar signal having a linearly ramping first frequency, and to generate in response to the second information signal a second sonar signal having a linearly ramping second frequency; and
   a local communication circuit coupled to the controller, operable to generate a command signal that represents the command, and operable to transmit the command signal to the remote communication circuit.

39. A non-transient computer-readable medium storing instructions that when executed by a processor, cause the processor:
   to generate at least one command that, when received by a communication circuit of an apparatus remote from the processor and having a transducer array, causes the communication circuit to generate first and second information signals, and causes the transducer array to generate in response to the first information signal a first sonar signal having a first frequency, and to generate in response to the second information signal a second sonar signal having a second frequency and overlapping but offset from the first sonar signal; and
   to cause a communication circuit local to the processor to generate a command signal that represents the at least one command, and to transmit the command signal to the remote communication circuit.

40. The apparatus of claim 12 wherein the transducer array is operable to receive the first and second sonar signals from a common source.

41. An apparatus, comprising:
   a transducer array operable to receive a first sonar signal having a first frequency, and to receive simultaneously a second sonar signal having a second frequency and offset in time from the first sonar signal;
   a communication circuit coupled to the transducer array and operable to generate a first information signal in response to the first sonar signal and operable to generate a second information signal in response to the second sonar signal;
   wherein the first sonar signal comprises a first pulse that is modulated by a first carrier signal having a frequency that changes linearly over a first range that includes the first frequency; and
   the second sonar signal comprises a second pulse that is modulated by a second carrier signal having a frequency that changes linearly over a second range that includes the second frequency.

42. A method, comprising:
   generating a first sonar signal having a first frequency and a first duration;
   generating a second sonar signal having a second frequency and a second duration that overlaps and is offset from the first duration;
   wherein generating the first sonar signal comprises
      modulating a first information signal with a first carrier signal, and
      linearly sweeping a frequency of the first carrier signal through a first range of frequencies, the first range having a center frequency approximately equal to the first frequency; and
   wherein generating the second sonar signal comprises
      modulating a second information signal with a second carrier signal, and
      linearly sweeping a frequency of the second carrier signal through a second range of frequencies, the second range having a center frequency approximately equal to the second frequency.

* * * * *